United States Patent

[11] 3,630,774

| [72] | Inventor | James W. Knight |
| | | Wilmslow, England |
| [21] | Appl. No. | 752,532 |
| [22] | Filed | Aug. 14, 1968 |
| [45] | Patented | Dec. 28, 1971 |
| [73] | Assignee | Corn Products Company |

[54] DISRUPTED GRANULAR STARCH PRODUCTS AND METHODS OF MAKING THEM
16 Claims, 4 Drawing Figs.

[52] U.S. Cl. .................................................. 127/32,
127/70, 127/71, 241/30
[51] Int. Cl. ........................................................ C13l 1/08
[50] Field of Search .......................................... 127/23, 32,
67, 71; 241/30, 175

[56] References Cited
UNITED STATES PATENTS

| 213,471 | 3/1879 | Toufflin ........................ | 241/30 X |
| 3,215,354 | 11/1965 | Smith ........................... | 241/30 |
| 3,352,773 | 11/1967 | Schwartz ..................... | 127/71 X |

OTHER REFERENCES

C.A. I, 52:19198c (1958).
C.A. II, 53:1795b (1959).
C.A. III, 57:6190i 6190i (1962).
S. Augustat I, Ernhrungsforschung, 3, 81– 90 (1958).
H. Grohn, J. Polymer Sci., 29, 647– 661 (1958).
S. Augustal III, Staerke, 14, 39– 49 (1962).

*Primary Examiner*—Morris O. Wolk
*Assistant Examiner*—Sidney Marantz
*Attorneys*—Frank E. Robgins, James L. Bailey, Janet E. Price, Robert D. Weist and Martha A. Michaels ABSTRACT: Process for making a granular starch product exhibiting a lower gelatinization temperature and a higher reactivity than the starch from which it is derived which includes subjecting the starch, in dry form or in an aqueous slurry, to the action of a vibration mill for a relatively short period of time.

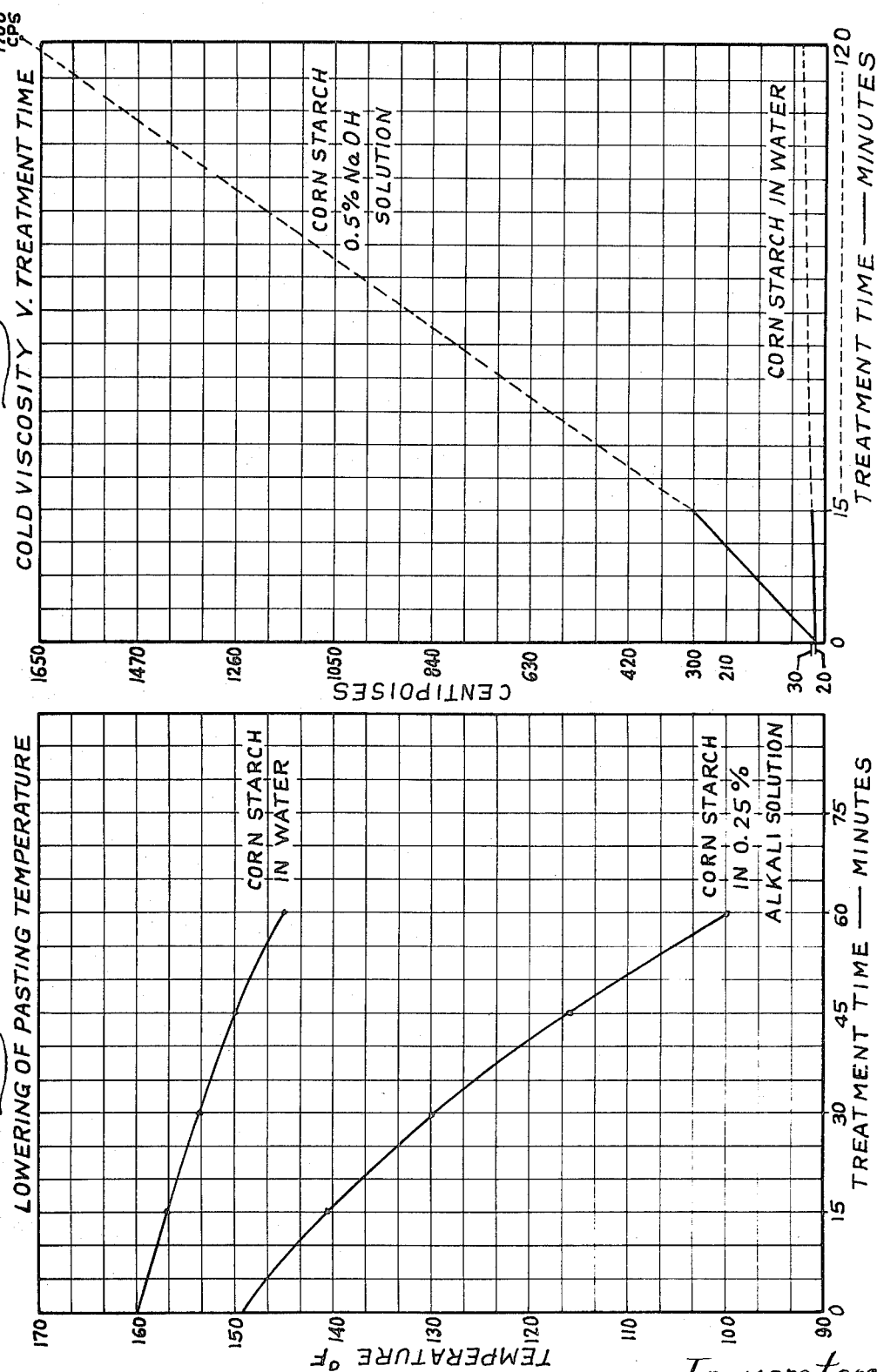

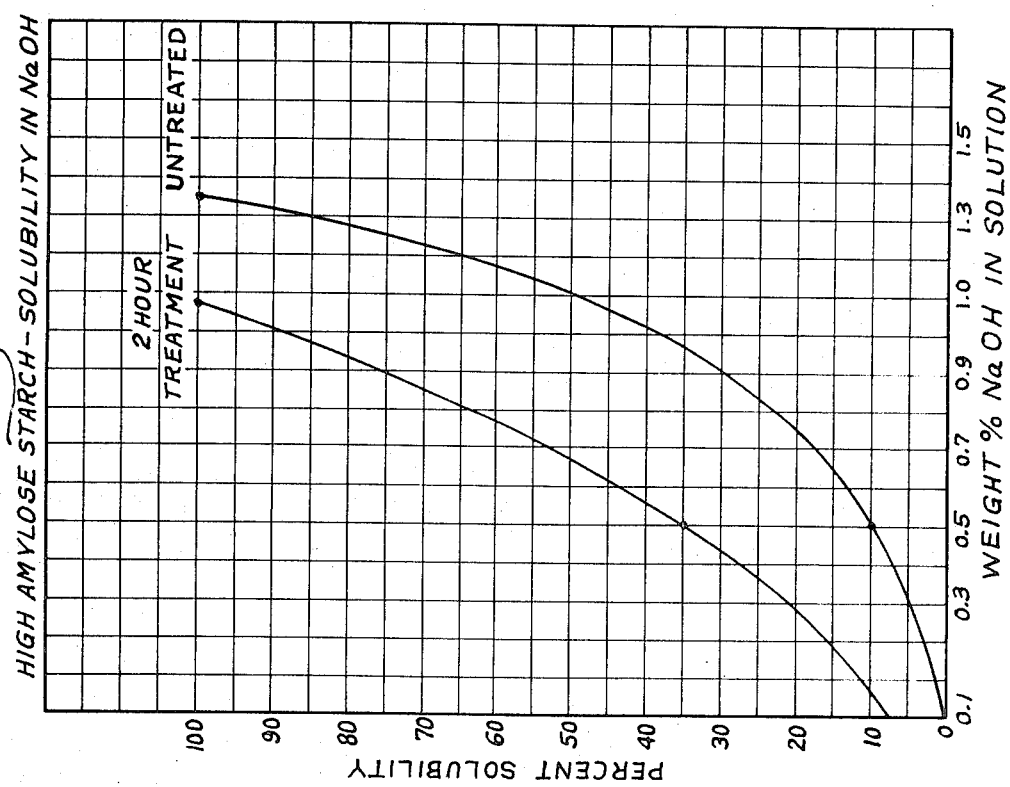
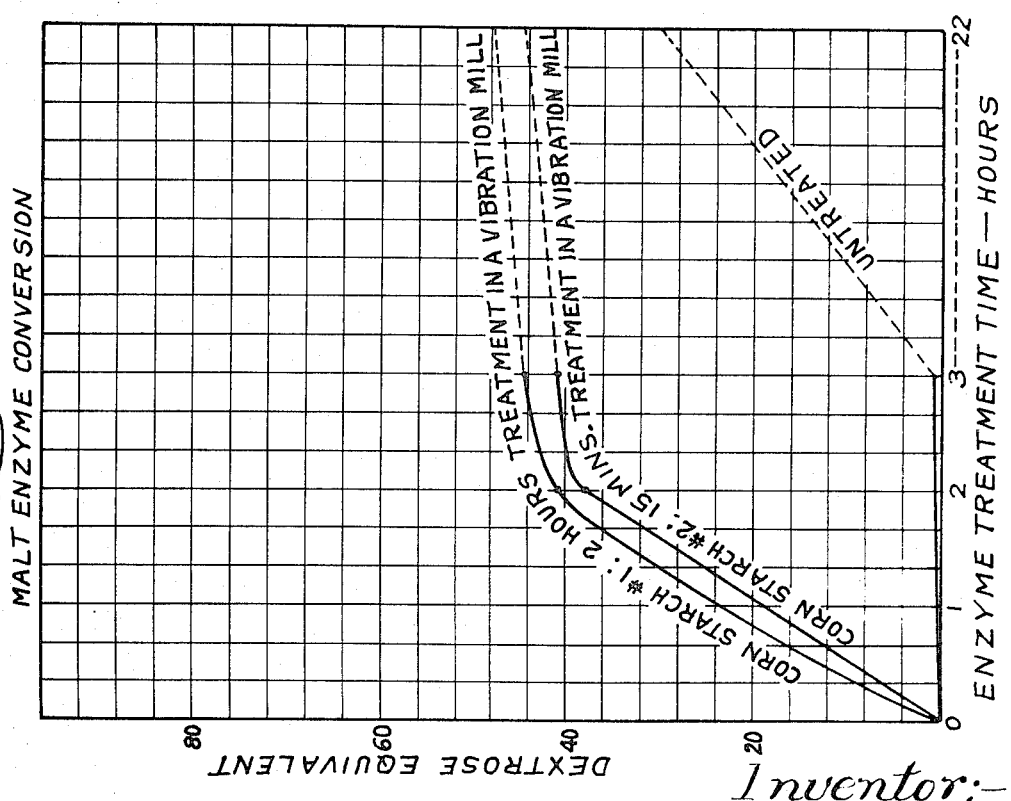

DISRUPTED GRANULAR STARCH PRODUCTS AND METHODS OF MAKING THEM

There is a continuing need for granular starch products that retain their original granular structure and that nevertheless have been altered in some manner, whereby they have greater susceptibility to chemical or enzymatic attack, and that exhibit materially greater solubility characteristics, especially in alkali solutions.

For example, granular starches are commonly used in the production of corrugating adhesives. Usually, a corrugating adhesive consists of two components, namely, a carrier phase that is an aqueous solution of a gelatinized starch, and an ungelatinized starch phase that is suspended in the carrier. The strength of the starch adhesive bond, that is formed by gelatinizing the raw starch phase in situ during the corrugating process, is almost entirely derived from gelatinization of the raw starch phase. The ideal corrugating adhesive would contain only the ungelatinized, raw, starch phase. Unfortunately, the use of raw granular starch alone has generally proven unsuccessful, due to poor solubility or dispersibility characteristics.

In other applications, the use of raw granular starch is frequently preferred to the use of pasted or gelatinized starch. For example, in many paper and textile applications, enhanced results are realized when the starch utilized has its granular structure intact. For example, raw granular starch is sold to papermakers for use in the preparation of paper coatings. It is treated with an enzyme preparation at the mill site, in order to convert it or impart to it the characteristics that are desirable for this application. This treatment of the raw granular starch generally involves some costs and requires time, due to the relatively low susceptibility of the starch to enzymatic attack.

In addition, the product that is sold and shipped is granular starch, even when gelatinized starch is to be used. Relatively high temperatures and long cook times are required to effect proper gelatinization. The user could save considerable time and energy requirements if the gelatinization temperature of the granular starch were measurably lowered by some means.

In view of the above, it therefore becomes an object of the invention to provide a method of making novel granular starch products, from raw starch sources, that have increased reactivity toward chemical reagents and enzymes, and that have lower gelatinization temperatures that the parent raw starches from which they are derived.

Another object of the invention is to provide a practical method of making such novel starch products that are characterized by increased solubility in cold water and by easier solubility and dispersibility in dilute alkali solutions, and that are therefore particularly adapted for use in a number of applications, such as in the preparation of corrugating adhesives.

A still further object of the invention is to provide a method of making granular starch products that have their normal molecular sequence disrupted and that have sites of increased reactivity introduced into their molecular structures and whose hydrogen bonding has been destroyed, at least to a degree.

A specific object of the invention is to furnish a granular starch derived from the method of the invention that exhibits increased susceptibility to enzymatic attack as compared to the parent raw starch, and that thereby can be more efficiently utilized in the manufacture of paper coatings and in other areas of use.

Yet another object of the invention is to provide a granular disrupted starch that exhibits a surprisingly high viscosity, particularly in mild alkali solutions, and that therefore finds particular utility as a bulking, bodying or dispersing agent in a variety of foodstuffs.

Yet another object of the invention is to provide practical methods of preparing novel products of the character described, utilizing simple equipment, without resort to specially tailored, sophisticated apparatus, which methods may be carried out rapidly and relatively simply.

Other objects of the invention will be apparent hereinafter from the specification and from the recitals of the appended claims. In accordance with the invention a unique method of making a disrupted and unique granular starch has been discovered. In its broadest aspects the process of the invention involves treating a starch-bearing material, in which the starch is present in granular form, with a source of energy of sufficient magnitude and for a sufficient length of time to disrupt the normal sequence of the molecules of the starch. The preferred treatment is vibration ball milling. The energy to which the starch-bearing material is subjected at least partially breaks down the bonding of the so treated starch and creates a multitude of sites of increased reactivity. The energy source should not be of such magnitude or duration of application as to destroy the granular structure of the so-treated starch.

A product made in accordance with the invention is particularly characterized as having a lower gelatinization temperature and a higher reactivity toward various chemical reagents than the original starch-bearing material. In particular, it has a measurably greater reactivity toward dilute alkali solutions, and greatly enhanced susceptibility to enzymatic attack.

FIGS. 1 to 4 inclusive are graphs which illustrate characteristic physical and chemical properties of products of the invention, particularly in relation to the original material from which they were derived. These will be described in more detail hereinafter.

DESCRIPTION OF THE PROCESS

The method of the invention may be carried out by a wide variety of techniques. It is only necessary that the source and magnitude of energy be such that the starch is disrupted in terms of achieving a product of the desired characteristics, while retaining its granular form. It is important that the starch not be over-treated with the energy source to the extent such that the granular structure is no longer retained.

The energy that is preferred to be applied is mechanical in character. Thus, for example, the initial starch-bearing material may be subjected to mechanical disruptive forces such as those applied by a vibration mill.

The amount of time necessary to effectuate the aims of the invention and achieve a suitable disrupted product will greatly vary depending on the magnitude of the energy applied to the initial starch-bearing material. As a guideline, when a vibration ball mill is utilized, a treatment time of from 5 to about 180 minutes is sufficient. In the more usual case, the starch is subjected to action of the vibration mill for 10–60 minutes. This is sufficient partially to break down the hydrogen bonding of the starch present, and to create desired sites of increased reactivity, without destroying the granular structure.

The most preferred equipment for the practice of the invention is the vibration ball mill. These mills are well known, and need little elaboration. The mill may be considered to be a mill shell containing a charge of balls, the shell being vibrated at a suitable frequency by some suitable device. The operating variables that require consideration are the extent to which the shell is filled with balls and the frequency and form of the vibration. Generally, vibration ball mills are operated with a high cycle of vibratory motion and a relatively small amplitude. Mills of this type may be used in the practice of the present invention whether the starch-bearing material is treated in the wet or dry form. The mill may be loaded with either balls or rods, generally made wither of porcelain or steel, to impinge upon the starch-bearing material with the proper force.

A series of vibrating mills suitable for use in the present invention, particularly for laboratory or pilot plant work, are marketed under different model numbers by Allis-Chalmers. These mills are formed from spring-mounted cylinders with dual eccentric mechanisms running horizontally on each side of the mill. The grinding chamber liners act as spring boards for the grinding charge.

Another suitable vibratory mill which does not utilize eccentric motors or out-of-balance weights is marketed by G. E. C. Engineering Limited of England. Here, the cubic mill operates as a two-mass resonant system with the live part of the machine supported within the heavy framework of the driving mass by an arrangement of rubber blocks. The vibrating motion is imparted to the live assembly, that is, the grinding chamber housed within a saddle tube, by electromagnets. The armature of the electromagnets are fitted to the saddle tube with the respective cores and coils mounted on the driving mass. As is common with most electromagnetic vibrating equipment, the pulsating unidirectional power supply to the coils is obtained by means of half-wave metal rectifiers working in conjunction with conventional rheostats. In a variation of this, silicon controlled rectifiers combine the functions of rectifying the alternating current supply and controlling the power output.

In order to practice the invention, the starch-bearing material is placed in the vibration mill in dry form or in wet slurry and the mill is then vibrated for the appropriate amount of time. One excellent way of following the reaction is to withdraw samples of the starch-bearing material from time to time and then observe the gelatinization temperature of the aliquot. Disrupted products of the present invention usually have had their gelatinization temperatures lowered from about 10° F. to about 30° F. in relation to the original material from which they have been obtained. Thus, it is a simple matter to follow the treatment by such a gelatinization or pasting test, and to terminate the vibration treatment when the product has had its gelatinization temperature lowered to the desired extent.

The disruption process may be carried out in a continuous manner. For example, a feed bin may be utilized in conjunction with a vibration mill in order to continuously feed the starch-bearing material into the mill. The product may then be continuously withdrawn from the mill after the appropriate residence time, conveyed to a storage hopper, and bagged for shipment and storage.

In addition to vibration mills, other energy applications may be used to disrupt or disorient the granular starch in the initial starch-bearing material. There are a number of other sources of mechanical energy which may be used to disrupt the starch generally in the manner described above. From the description hereinafter the sources and their means of application will be apparent to those skilled in the art.

The process of the invention is adaptable to the disruption of substantially any initial starch-bearing material that contains raw granular starch. The initial starch-bearing material may be, for example, granular starch, flour, grits or cereals that contain raw granular starch from any vegetable source, such as, for example, corn, wheat, potato, tapioca, rice, sago and grain sorghum. Waxy starches may also be used. Modified granular starches may also be utilized, such as, for example, granular cationic or anionic starches, and, as well, other previously treated starch materials such as granular oxidized starches, granular crossbonded starches, and the like. The initial starch-bearing material may also be a starch that has been phosphated, sulfated, and the like, to yield anionic starch derivatives, or it may contain amine or quaternary ammonium groups, which impart a cationic character to said starch. Thus, any type of ungelatinized starch may be used as a starting material as long as it is granular in character.

DISRUPTED GRANULAR STARCH PRODUCTS

The products of the invention are somewhat difficult to describe in terms of their per se physical structures, and are best characterized by reference to their chemical and physical properties, particularly in relation to the parent material from which they are derived. The products of the invention retain their granular starch structure. It appears that the effect of the treatment of the invention is to at least partially break down the hydrogen bonding of the starch by a type of disorientation or destruction of the normal molecular sequence of the starch. Moreover, sites of increased reactivity are created. It is not completely clear exactly how these highly reactive areas are created, but it is theorized that an electrical imbalance is created due to the energy application.

One of the most striking characteristics of the products of the invention is that they considerably lowered gelatinization temperatures relative to the parent materials. The gelatinization temperature may be lowered by an amount within the range of 10°–30° F. as compared to the initial material. In the more typical situation, the gelatinization temperature is lowered 15°–25° F.

Another effect noted is greatly enhanced reactivity with respect to a number of chemicals. Due to their increased reactivity, the products described herein are more easily physically and chemically modified such as by oxidation, crossbonding, etherification, and the like. Thus, the disrupted starch products may be more easily reacted with chemicals such as urea, borax, phosphates, alkylene oxides, acids, and the like.

The disrupted starch products of the invention demonstrate particularly enhanced susceptibility to alkali. The products of the invention have many times greater solubility in dilute aqueous alkaline solutions compared with the corresponding raw starch.

Even without alkali, the disrupted starch products of the invention readily form a suspension in cold water. This is in direct contrast to the difficulty in forming a like suspension with the initial starch-bearing material in which the starch is present in raw granular form.

The disrupted starch products also show definitely enhanced susceptibility or receptivity to enzymatic attack, and demonstrate a much reduced time for any desired degree of enzymatic conversion, compared to the initial starch-bearing materials. Looking at it in an alternate way, a marked reduction in the amount of enzyme is required to reach a given conversion level in a given amount of time when a disrupted starch product is converted, relative to the initial starch-bearing material.

DETAILED DESCRIPTION OF PRODUCTS OF THE INVENTION

Several demonstrations of the invention were carried out, using vibration ball mills, with a view of characterizing the disrupted starch products of the invention as outlined in the accompanying drawings.

FIG. 1 graphically illustrates the lowered gelatinization temperatures of disrupted starch products produced in accordance with the invention. As the initial corn starch was treated for longer periods of time, it exhibited gradually lowered gelatinization temperature. In this work, a corn starch was treated in a vibration ball mill, and aliquots were withdrawn at intervals and were tested for their gelatinization temperatures. In these particular runs, steel balls were utilized in the vibration mill.

As one illustrative example, it should be noted that a typical product of the invention, after being subjected to treatment in the vibration mill for 60 minutes, had a gelatinization temperature of about 147° F. when gelatinized in water alone. On the other hand, the initial raw corn starch, from which it was derived, had a gelatinization temperature of about 160° F.

Even more striking is the lowering of the gelatinization temperatures of products of the invention when dilute alkali solutions are used to effect gelatinization. Thus, for example, the initial raw corn starch was gelatinized in a 0.25 percent alkali solution at a temperature of about 149° F. A product derived from the same corn starch, after treatment in accordance with the presently disclosed method for 60 minutes in a vibration mill, gelatinized at 100° F. when a alkali solution at the same concentration was used. This susceptibility to alkali was completely unexpected in view of the fact that the granular structure is essentially unaltered, particularly when one considers the magnitude of the lowering of the gelatinization temperature.

FIG. 2 also graphically illustrates an extremely desirable property of products described herein in terms of their exceptionally high cold water viscosity. Again, raw corn starch was treated in a vibration mill, and a number of aliquots withdrawn from the mill were compared with raw starch in terms of viscosity in water alone and in the presence of dilute alkali aqueous solutions. Viscosities were all measured at 15 percent starch solids at 77° F. As is apparent from the graph, the viscosity of corn starch, either in water or in a dilute solution containing 0.5 percent sodium hydroxide, was about 20 centipoises. On the other hand, depending upon the duration of treatment in the vibration mill, the viscosity of the disrupted corn starch products in water was increased somewhat, and in dilute alkali was markedly increased. The viscosity increase is particularly noticeable when dilute sodium hydroxide solution is used as a solvating medium for the granular disrupted starch products of the invention.

The disrupted products of the invention are particularly susceptible to enzymatic attack, making them exceptionally attractive as starting materials in conversions of this type, as is shown graphically in FIG. 3. Cornstarch samples treated for 15 minutes and 2 hours respectively in a vibration mill were then subjected to attack by a malt enzyme. For comparison, a raw granular untreated corn starch was also so subjected.

As is readily discernible by a visual comparison of the results shown in this graph, corn starch syrups of different D.E. levels were produced in exceptionally short periods of time from the two disrupted starch products made in accordance with the present invention, as compared with the enzymatically converted raw untreated corn starch.

In this specific series of runs, the enzymatic conversions were carried out at 149° F. and at a pH of 5.5. Thus, for example, to produce a corn conversion syrup of a D.E. of about 20 took approximately 1 hour or less with both of the disrupted products of the invention. To achieve the same 20 D.E. conversion product with raw corn starch took approximately 15 hours, or 15 times as long. Such a difference in results is strikingly noticeable and dramatically demonstrates the differing chemical and physical characteristics of the starch products described herein in relation to the parent raw starch.

Of the more difficult problems faced in the starch industry is resistance of high amylose starches to solubilization in appreciable amounts, even in the presence of alkali. In the next series of experiments, a high amylose starch was disrupted in a vibration mill for 2 hours, and the disrupted product was solubilized in sodium hydroxide aqueous solutions of differing concentrations. The parent raw starch from which this disrupted product was derived similarly solubilized. Attention is now drawn to FIG. 4, wherein a comparison is presented of solubility characteristics of the two starch materials, that is, the disrupted starch product and the initial high amylose starch.

All solubility tests were run at 20° C. Again, the disrupted granular starches described here have exceptionally high solubility in dilute alkali solutions even though they have been derived from a high amylose starch. For example, at a 0.7 percent sodium hydroxide solution level, the disrupted starch product made in accordance with the invention had about a 52 percent solubility in this alkali medium. The initial high amylose starch starting material, in the same alkali solution, dissolved only to the extent of 16 percent. This work is further evidence of the surprisingly unexpected properties of the disrupted starch products of the invention, which markedly differ from the starting material.

In practicing the invention, the extent to which the initial material is disrupted is most conveniently expressed in terms of units of disruption. These can be measured in the following way, which is a modification of the method used by Greer and Stewart to measure damage to flour caused by milling; J. Sci. Food Agr. 10 (4), 248-252 (1959).

DETERMINATION OF DAMAGED STARCH CONTENT OF PURE STARCH

APPARATUS

Set of 4 oz. wide-necked stoppered bottles.
Set of 100 ml. conical flasks.
Set of 4-inch diameter filter funnels.
Set of 100 ml. Kjeldahl flasks.
1×25 ml. pipette.
1×1 ml. pipette.
Graduated.
6×5 ml. pipettes.
1×50 ml. graduated cylinder.
1×25 ml. burette.
Supply of Green's No. 400 (18.5 cm. diam.) filter papers.
Thermostatically controlled water bath.
Boiling water bath with fittings for 100 ml. Kjeldahl flasks.
Funnel rack.

REAGENTS

Acid washed quartz sand.
Wallerstein beta-amylase.

| | |
|---|---|
| Acetate buffer (pH 4.6) | 7½ ml. glacial acetic acid (A.R.) in 500 ml. distilled water. Add 17.0 g. A.R. sodium acetate trihydrate, and make up to 2.5 litres with distilled water. |
| 10% v./v. sulphuric acid | |
| 12% w./v. sodium tungstate | 60 g. A.R. sodium tungstate dissolved in 400 ml. warm distilled water, cooled, and made up to 500 with distilled water. |
| Alkaline ferricyanide | 16.5 g. A.R. potassium ferricyanide dissolved in 500 ml. warm distilled water. 22 g. A.R. anhydrous sodium carbonate added, cooled and made up to 1 liter with distilled water. (Store in dark bottle). |
| Acetic acid reagent | 50 g. A.R. zinc sulfate (7H$_2$O) dissolved in approx. 500 ml. hot distilled water. 1 liter cold distilled water added, followed by 175 g. A.R. potassium chloride. After cooling, add 500 ml. glacial acetic acid and make up to 2.5 liters with distilled water. |
| Potassium iodide Solution | 25 g. A.R. potassium iodide dissolved in a little distilled water. 1 drop of 50% sodium hydroxide solution added, and made up to 50 ml. with distilled water. (this solution should be made as required). |
| Starch solution | 5 g. of soluble starch made into a thin paste with 50 ml. distilled water. Paste poured into 300 ml. boiling distilled water. After cooling, 150 g. A.R. sodium chloride added, and made up to 500 ml. with distilled water. |
| Sodium thiosulfate | 6.205 g. A.R. sodium thiosulfate dissolved in approx. 400 ml. warm distilled water. After cooling 1 drop of chloroform added, and made up to 500 ml. with distilled water. |

METHOD

Weigh 5 g. of starch into a 4 oz. stoppered bottle, add 2 to 3 g. acid washed quartz sand, and leave the bottle in a water bath at 30° C. for 15 min.

In the meantime weigh 0.3 g. beta-amylase and dissolve in a little acetate buffer which has been previously brought to 30° C., and make up to 100 ml. with buffer solution.

Add 46 ml. of the buffered beta-amylase solution to the sample which has been at 30° C. for 15 min. and incubate at 30° C. for 4 hours, shaking the bottle at 30 min. intervals. During the incubation period, determine the moisture content of the sample under test if this is required for correction purposes during the calculation of results.

After 4 hours add 2 ml. of 10 percent v./v. sulfuric acid, and 2 ml. of 12 percent w./v. sodium tungstate solution, and mix thoroughly. Allow to stand for 2 min. then filter, discharging the first 10 drops or so. After filtering for 20 min. only, pipette 0.5 ml. of the filtrate into a 100 ml. Kjeldahl flask containing 10 ml. alkaline ferricyanide solution and 2.5 ml. distilled water and mix thoroughly. Immerse the flask in vigorously boiling water for 20 min. ensuring that the solution level in the flask is 1 inch below the boiling water level. Cool the flask in running water and transfer the contents into a 100 ml. conical flask. Rinse the Kjeldahl flask with 25 ml. of acetic acid reagent and add to the 100 ml. conical flask. After mixing, add 1 ml. of the potassium iodide solution, 2 ml. of starch solution, and titrate the liberated iodine with sodium thiosulfate solution until the blue color is discharged.

CALCULATION: EXAMPLE

Originally we have 5 g. of starch in 50 ml. of solution, but only 0.5 ml. of solution are used in the actual analysis.

| | | |
|---|---|---|
| Now alkaline ferricyanide added | = | 10 ml. |
| And sodium thiosulfate titre | = | 1 ml. |
| The difference | = | 9 ml. |

Now 9 ml. alkaline ferricyanide = 14.8 mg. maltose (from attached table) and this is from 0.5 ml. solution.

Therefore, 50 ml. solution contains $$\frac{50 \times 14.8}{0.5} \text{ mg. maltose/5 gm. starch}$$

Now $$= \frac{50 \times 14.8}{0.5 \times 5} = 296 \text{ mg. maltose/gm. starch}$$

371 mg./gm. = 100% damaged starch — (an arbitrary scale)

Therefore, $$296 \text{ mg. maltose/gm.} = \frac{296 \times 100}{371}$$

= 79.8% damaged starch (79.8 units of disruption)

This value has not been corrected for the moisture content of the original starch sample, and is the "as is" value.

Starch damage values from approximately 1.5 percent to 92 percent can be determined by this method. For values above 92%, the weight of original starch sample taken must be reduced.

Obviously, it is possible to measure units (percent) of disruption at any value obtained, by this technique.

TABLE 1.—MALTOSE CONVERSION TABLE

| 0.05N ferricyanide reduced (ml.) | Maltose equivalent (mg.) | 0.05N ferricyanide reduced (ml.) | Maltose equivalent (mg.) | 0.05N ferricyanide reduced (ml.) | Maltose equivalent (mg.) | 0.05N ferricyanide reduced (ml.) | Maltose equivalent (mg.) |
|---|---|---|---|---|---|---|---|
| 0.1 | 0.2 | 2.6 | 4.2 | 5.1 | 8.3 | 7.6 | 12.3 |
| 0.2 | 0.3 | 2.7 | 4.4 | 5.2 | 8.4 | 7.7 | 12.5 |
| 0.3 | 0.5 | 2.8 | 4.5 | 5.3 | 8.6 | 7.8 | 12.7 |
| 0.4 | 0.6 | 2.9 | 4.7 | 5.4 | 8.7 | 7.9 | 12.9 |
| 0.5 | 0.8 | 3.0 | 4.9 | 5.5 | 8.9 | 8.0 | 13.0 |
| 0.6 | 1.0 | 3.1 | 5.0 | 5.6 | 9.1 | 8.1 | 13.2 |
| 0.7 | 1.1 | 3.2 | 5.2 | 5.7 | 9.2 | 8.2 | 13.4 |
| 0.8 | 1.3 | 3.3 | 5.3 | 5.8 | 9.4 | 8.3 | 13.5 |
| 0.9 | 1.5 | 3.4 | 5.5 | 5.9 | 9.6 | 8.4 | 13.7 |
| 1.0 | 1.6 | 3.5 | 5.7 | 6.0 | 9.7 | 8.5 | 13.9 |
| 1.1 | 1.8 | 3.6 | 5.8 | 6.1 | 9.9 | 8.6 | 14.0 |
| 1.2 | 1.9 | 3.7 | 6.0 | 6.2 | 10.0 | 8.7 | 14.2 |
| 1.3 | 2.1 | 3.8 | 6.2 | 6.3 | 10.2 | 8.8 | 14.4 |
| 1.4 | 2.3 | 3.9 | 6.3 | 6.4 | 10.4 | 8.9 | 14.6 |
| 1.5 | 2.4 | 4.0 | 6.5 | 6.5 | 10.5 | 9.0 | 14.8 |
| 1.6 | 2.6 | 4.1 | 6.6 | 6.6 | 10.7 | 9.1 | 15.0 |
| 1.7 | 2.8 | 4.2 | 6.8 | 6.7 | 10.9 | 9.2 | 15.2 |
| 1.8 | 2.9 | 4.3 | 7.0 | 6.8 | 11.0 | 9.3 | 15.4 |
| 1.9 | 3.1 | 4.4 | 7.1 | 6.9 | 11.2 | 9.4 | 15.6 |
| 2.0 | 3.2 | 4.5 | 7.3 | 7.0 | 11.3 | 9.5 | 15.9 |
| 2.1 | 3.4 | 4.6 | 7.5 | 7.1 | 11.5 | 9.6 | 16.1 |
| 2.2 | 3.6 | 4.7 | 7.6 | 7.2 | 11.7 | 9.7 | 16.5 |
| 2.3 | 3.7 | 4.8 | 7.8 | 7.3 | 11.8 | 9.8 | 17.0 |
| 2.4 | 3.9 | 4.9 | 7.9 | 7.4 | 12.0 | | |
| 2.5 | 4.1 | 5.0 | 8.1 | 7.5 | 12.2 | | |

EXAMPLE 1

Production of Corn Starch with 50 Units of Disruption

To illustrate the process of the invention further, a specific production operation will now be described in detail, as performed on a pilot plant scale. The equipment employed will be described first.

Physical Characteristics of the Chalmers Vibration Mill

Machine Specification

| | |
|---|---|
| Size | 15 inches × 18 inches diam. |
| Weight of machine, without grinding media | 2,440 lbs. |
| Dual drive with two motors | 7.5 hp. 1440 r.p.m. 400/440 volt and 3 phase, 50 cycle. |
| Power supply | 10 kw. 18 amp. |
| Ball charge weight (Steel) | 310 lbs. (141 kg.) |
| Grinding chamber volume | 1.60 ft.³ |
| Ball Charge volume | 1.28 ft.³ |
| Ball charge voids | 0.512 ft.³ |
| Displacement ½ inch (1.27 cm.) | |
| Average throughput of the machine with steel balls | 40 lbs./min.—2,400 lbs./hr. |

To achieve the desired level of disruption, the initial corn starch was passed through the machine five times with steel balls. Actual throughput was about 480 lbs./hr., with a calculated residence time in the mill of 10 to 15 minutes.

To calculate the power requirements of the feed material, the technique employed by Rose and Sullivan was used; Vibration Mills and Vibration Milling, H. E. Rose & R. M. E. Sullivan Constable & Co., Ltd., London, 1961. Because the theory is based on specific surface created by the breakdown of the material, this approach has been modified to use the power dissipated into the ball charge rather than the feed. From the Rose and Sullivan text:

The power absorbed by the ball charge (Pc) equals:

$Pc = 3.0 \times 10^{-8} w^3 \alpha^2 Mc$ $Pc$ = power dissipated (kw.)

where $w$ = frequency in radius/sec.

$\alpha$ = amplitude in cms.

= amplitude of the vibration
which is only half of the total displacement.

Mc = mass of mill charge (kg.)

Therefore at 1,440 r.p.m. w=152 radius/sec. at a displacement of 1.27 cm., amplitude = 0.635 cm.

310 lbs. ball charge = 141 kg.

Therefore $$Pc = 3.0 \times 10^{-8}(152)^3(0.635)^2 141$$
$$= 3.0 \times 3.511 \times 0.403 \times 1.41$$
$$= 5.984 \text{ kw. to ball charge}$$

A reasonable efficiency for he machine would be say 30 percent of this power to be dissipated into the feed material.

Therefore 5.984×0.30=1.795 kw.

If the material is produced at a rate of 480 lbs./hr. (218 kg./hr.), the power required = 1.795/218 = 0.00823 kw./kg. or 29.628 joules/kg.

Say, approx. 30,000 joules/kg.

The disrupted corn starch product, that was recovered from the machine, was evaluated for units of disruption by the technique previously described. The value determined was 50. The disrupted product had substantially intact polarization crosses, pasted readily in the presence of an alkali, and swelled rapidly in water. It had a reduced gelatinization temperature as compared to the initial corn starch. It was characterized by great reactivity with chemicals and enhanced susceptibility to enzymatic action.

It made up easily into an adhesive at neutral pH. This adhesive was easily waterproofed with a urea-formaldehyde resin.

APPLICATIONS FOR THE DISRUPTED PRODUCTS

Due to their excellent solubility and viscosity properties, susceptibility to enzyme attack, and great reactivity with chemicals of diverse character, the disrupted starch products of the invention find utility in a myriad of application areas of varying types.

One particular use for which the disrupted starches are admirably suited is in the preparation of corrugating adhesives. Due to their excellent response to alkali, the disrupted starch products maybe used in a single component system, thereby obviating use of a two-component system including a gelatinized and ungelatinized starch as now generally utilized. The starch materials described here impart a strong adhesive starch bond to both "single-facer" and "double-backer" corrugated paperboards. In order to prepare an appropriate adhesive composition, it is only necessary to make a slurry of disrupted starch in water, usually one containing 10–40 percent starch solids by weight. To this is normally added alkali and borax. The alkali is added in an amount that the pH of the slurry generally falls in the range between about 8 and about 13. During application, the mixture is heated, and the resultant adhesive is applied in the conventional manner.

In still another corrugating adhesive embodiment the disrupted starch is formed into a suspension with cold water alone. It is then used as such without pH adjustment and with or without urea-formaldehyde resin adjuncts as weatherproofing agents. Corrugating compositions utilizing the starch materials described here may be used as normal, weatherproofing and waterproofing corrugating adhesives.

For the preparation of a corrugating adhesive, a disrupted corn starch having 20 to 200 units of disruption is highly suitable.

In yet another field the products of the invention are utilized in those applications which require an initial enzymatic conversion. Thus, they are used to treat paper, employed as textile sizes, and the like. In one specific application the starches are enzymatically converted in the facile manner set out above and utilized in paper coating compositions. Such materials may be equally used in treating other cellulosic fibrous materials such as textiles.

Thus, as an example herein, in order to form a suitable paper coating composition, clay or another inert mineral pigment and a binder comprising a disrupted starch product are all dispersed in water. The coating composition usually will contain 20–70 weight percent solids, including 30–60 percent inorganic pigment based on solids weight, and 5–25 percent of the starch binder of this invention, also based on solids weight. In addition to the preferred pigment which is clay, other inorganic metallic pigments may be used such as talc, titanium dioxide, blanc fixe, powdered tin, precipitated chalk, satin white, ground limestone, and the like.

Other proposed uses for the disrupted starches can be found in converting these materials to alcohol in the brewing industry. As just one instance, corn starch cannot normally be enzymatically reacted here without first being gelatinized. Utilizing the disrupted products described, the enzyme conversion may be effected at say about 149° F. (65° C.) without any gelatinization pretreatment of the corn starch.

A still further use for the disrupted starches is as a feed for various animals such as calves. Such disrupted materials are more readily digestible than other starch products and are eminently useful here.

A still further use for the invention is in the processing of wheat flour which is intended for use in the preparation of sugars. By disrupting the starch in the wheat flour, enzymatic conversion of the starch can be effected at a lower temperature than usual so that the wheat gluten therein is not heat denatured.

Lastly, due to their excellent reactivity as described above the disrupted starches of the invention maybe converted or derivatized by simple techniques to form many useful products for several different applications which are apparent to those skilled in the art of starch technology and its areas of use.

Generally, useful results are obtained when the disrupted product has from about 20 to about 250 units of disruption.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A method of treating a starch-bearing material in which the starch is in granular form, that comprises:

subjecting said starch-bearing material to the action of a vibration mill for a length of time in the range from about 5 minutes to about 180 minutes and sufficient to disrupt the orderly sequence of the molecules of the starch, and to alter but not to destroy its granular structure, and recovering a granular starch product that has a lower gelatinization temperature and higher reactivity than the raw granular starch from which it is derived.

2. A method of treating a starch-bearing material in accordance with claim 1 wherein the material is treated in the vibration mill for a sufficient time to lower the gelatinization temperature of the product by from about 10° F. to about 30° F. in relation to the gelatinization temperature of the untreated original material.

3. A method of treating a starch-bearing material in accordance with claim 1 wherein said starch-bearing material is subjected to the action of the vibration mill in dry form.

4. A method of treating a starch-bearing material in accordance with claim 1 wherein the material is subjected to the action of the vibration mill in the form of an aqueous slurry.

5. A method of treating a starch-bearing material in accordance with claim 1 wherein the material is subjected to the action of the vibration mill for not more than 60 minutes.

6. A starch-bearing material in which the starch is in raw, granular form, wherein the starch is characterized by from about 20 about 250 units of disruption, produced by subjecting the starch-bearing material to the treatment method of claim 1.

7. A process for enhancing the susceptibility of a starch-bearing material, in which the starch is in granular form, to enzymatic attack, comprising subjecting the material to the action of a vibration ball mill for a period of time in the range from about 5 minutes to about 180 minutes, and recovering the starch-bearing material in granular form 8. A process for altering the characteristics of the starch in a starch-bearing material, in which the starch is present in granular form, comprising:

subjecting the material to the action of vibration ball mill for a period of time not in excess of about 180 minutes, to produce from about 20 to about 250 units of disruption in the starch, and recovering the disrupted starch product.

9. A process in accordance with claim 8 wherein the starch material is raw granular milo starch.

10. A process in accordance with claim 8 wherein the starch material is raw granular wheat starch.

11. A process in accordance with claim 8 wherein the starch material is raw granular corn grits.

12. A process in accordance with claim 8 wherein the starch material is raw granular oat starch.

13. A process in accordance with claim 8 wherein the starch material is raw granular potato starch.

14. A process in accordance with claim 8 wherein the starch is raw granular sago starch.

15. A process in accordance with claim 8 wherein the starch material is raw granular tapioca starch.

16. A process in accordance with claim 8 wherein the starch material is raw granular waxy sorghum starch.

* * * * *